(12) United States Patent
Wu et al.

(10) Patent No.: US 10,473,832 B2
(45) Date of Patent: Nov. 12, 2019

(54) SHEET STRUCTURE FOR PROTECTING THE SCREEN OF AN ELECTRONIC DEVICE WITH A CURVED SURFACE AND METHOD OF MAKING THE SAME

(71) Applicant: Xiulan Wu, Shenzhen, Guangdong (CN)

(72) Inventors: Xiulan Wu, Shenzhen (CN); Zhiguang Wen, Yichun (CN)

(73) Assignee: Xiulan Wu, Shenzhen, Guangdong Province (CN)

( * ) Notice: Subject to any disclaimer, the term of this patent is extended or adjusted under 35 U.S.C. 154(b) by 207 days.

(21) Appl. No.: 15/682,019

(22) Filed: Aug. 21, 2017

(65) Prior Publication Data
US 2018/0356570 A1    Dec. 13, 2018

(30) Foreign Application Priority Data
Jun. 7, 2017    (CN) .......................... 2017 1 0424342

(51) Int. Cl.
| | |
|---|---|
| *G02B 1/14* | (2015.01) |
| *G02B 5/10* | (2006.01) |
| *G06F 1/16* | (2006.01) |
| *G06F 3/041* | (2006.01) |
| *B32B 17/06* | (2006.01) |
| *H04M 1/18* | (2006.01) |
| *H04M 1/02* | (2006.01) |

(52) U.S. Cl.
CPC .............. *G02B 5/10* (2013.01); *B32B 17/063* (2013.01); *B32B 17/064* (2013.01); *G02B 1/14* (2015.01); *G06F 1/1626* (2013.01); *G06F 1/1637* (2013.01); *G06F 3/041* (2013.01); *H04M 1/185* (2013.01); *C09J 2201/28* (2013.01); *C09J 2201/36* (2013.01); *C09J 2203/318* (2013.01); *C09J 2400/143* (2013.01); *G06F 2200/1634* (2013.01); *H04M 1/0266* (2013.01)

(58) Field of Classification Search
None
See application file for complete search history.

(56) References Cited

FOREIGN PATENT DOCUMENTS

JP    3207091 U    * 10/2016

OTHER PUBLICATIONS

Machine Translation of Japanese Patent 3207291, Date Unknown.*

* cited by examiner

*Primary Examiner* — Jeffry H Aftergut
(74) *Attorney, Agent, or Firm* — Li & Cai Intellectual Property (USA) Office

(57) ABSTRACT

The present disclosure relates to a sheet structure for protecting the screen of an electronic device with a curved surface. The sheet structure includes a back plate, an adhesive layer, and a heat-bent clear glass sheet in the order from the side contacting the screen of the electronic device towards the other side of the sheet structure. The back plate is made by measuring and copying the curvature of the curved surface of the electronic device. The adhesive layer is made of an organic compound and used for sticking the back plate and the heat-bent clear glass sheet together and at the same time filling the concave surface of the heat-beat clear glass sheet. The heat-bent clear glass sheet complements the curved surface of the electronic device through the adhesive layer so as to protect the curved surface of the electronic device when adhering thereto.

19 Claims, 2 Drawing Sheets

SHEET STRUCTURE FOR PROTECTING THE SCREEN OF AN ELECTRONIC DEVICE WITH A CURVED SURFACE AND METHOD OF MAKING THE SAME

BACKGROUND OF THE INVENTION

1. Field of the Invention

The present disclosure relates to a sheet structure; more particularly, to a sheet structure that protects the screen of an electronic device with a curved surface and method of making the same.

2. Description of Related Art

Electronic devices, such as smartphones, mobile phones, portable media players such as tablet computers, etc., are widely used nowadays. With the increasing demand for high quality electronic devices, the ones with curved screens are more popular than ever. However, the curvature on the screen increases the difficulty of protecting the screen, which has thus become a challenge in the art.

Most existing techniques that serve to protect curved screens utilize common release liners, which is not suitable for pressurizing and qualitative processes. In addition, air bubbles can easily form on the curved screen after sticking the release liner to the screen, that is to say, most release liners in the prior art do not cover the entire screen. Furthermore, due to insufficient hardness of conventional release liners, scratches on the release liners can hardly be prevented and the level of protection against shock is low.

In recent years, hard glass such as tempered glass has been applied to screen protection for electronic devices. However, owing to some problems that might occur during the processing of the glass, the heat-bent glass may have uneven surfaces, making it hard to completely cover the screen without gaps between the screen and the glass. Consequently, the visual quality provided by the screen may be lowered due to distorted reflection and optical distortion.

Moreover, like other screen protectors, e.g. PET protectors, heat-bent glasses cannot be bound with adhesive layers without gaps and air bubbles generated therebetween, which causes an unappealing appearance of the screen and poor adhesion between the screen and the heat-bent glass. In addition, another problem with hard glass is that the abrasion between the screen and the hard glass, which causes damage to the screen, is hard to avoid.

Accordingly, to provide screen protection for electronic devices with a curved surface is still an issue to be solved.

SUMMARY OF THE INVENTION

In order to overcome the above-mentioned problems, one embodiment of the present disclosure provides a sheet structure for protecting the screen of an electronic device with a curved surface. The sheet structure includes a back plate, an adhesive layer, and a heat-bent clear glass sheet in the order from the side contacting the screen of the electronic device towards the other side of the sheet structure. The back plate is made by measuring and copying the curvature of the curved surface of the electronic device. The adhesive layer is made of an organic compound and used for sticking the back plate and the heat-bent clear glass sheet together and at the same time filling the concave surface of the heat-beat clear glass sheet. The heat-bent clear glass sheet has a curve portion and a plane portion. The heat-bent clear glass sheet complements the curved surface of the electronic device through the adhesive layer so as to protect the curved surface of the electronic device when adhering thereto.

Preferably, a mutual pressure between the back plate and the heat-bent clear glass sheet forces the adhesive layer entering the concave surface of the heat-bent clear glass sheet, in which the mutual pressure is preferably higher than or equal to 15 kg/cm$^2$.

Preferably, the back plate, the adhesive layer and the heat-bent clear glass layer are accommodated in a container having a negative pressure.

Preferably, the container having a negative pressure is a vacuum package bag.

Preferably, a hot-pressing process or a UV curing process is performed on at least the adhesive layer.

Preferably, the material of the back plate is selected from at least one of plastic, paper, and metal.

Preferably, the material of the adhesive layer is selected from at least one of AB glue, thermoplastic elastomer pressure sensitive adhesive, silicone gel, pressure sensitive adhesive, and UV curable adhesive.

Preferably, the heat-bent clear glass sheet is made of a 2.5D curved glass or a 3D curved glass.

Preferably, the level of adhesion between the adhesive layer and the heat-bent clear glass sheet is greater than that between the adhesive layer and the back plate.

Another aspect of the present disclosure provides a method of manufacturing a sheet structure, which includes:

a step of sticking or applying an adhesive layer to a back plate and/or a heat-bent clear glass sheet;

a step of binding the back plate to the heat-bent clear glass sheet;

a step of performing a pressure treatment, a hot-pressing process, or a UV curing process on where the back plate and the heat-bent clear glass sheet are bound together; and a step of testing the adhesion between the curve portion of the heat-bent clear glass sheet and the back plate in which, if a gap exists between the curve portion and the back plate, the level of adhesion is determined to be defective, and if there is no gap between the curve portion and the back plate, the level of adhesion is determined to be approved.

The present disclosure further provides a full-screen covering back plate which self-restores the smoothness of a heat-bent glass. The full-screen covering back plate includes a back plate, an adhesive, and a heat-bent clear glass sheet, characterized in that the back plate is made by measuring and copying the curvature of the curved surface of the electronic device.

Preferably, the adhesive is stuck or applied to the heat-bent clear glass sheet, in which the back plate adheres to another side of the adhesive. Preferably, the material of the back plate is selected from at least one of plastic, paper, and metal. The material of the adhesive layer is selected from at least one of AB glue, thermoplastic elastomer pressure sensitive adhesive, silicone gel, pressure sensitive adhesive, and UV curable adhesive.

Preferably, the heat-bent clear glass sheet is made of a 2.5D curved glass or a 3D curved glass.

The present disclosure has the following advantages: the sheet structure of the present disclosure includes a heat-bent clear glass sheet, an adhesive adhering to the heat-bent clear glass sheet, and a back plate adhering to another side of the adhesive. The back plate is made by measuring and copying the curvature of the curved surface of the electronic device. A vacuum process, a pressure treatment, a hot-pressing process, or a UV curing process is performed on where the back plate and the heat-bent clear glass sheet are bound together. The present disclosure utilizes the adhesive to fill the concave surface of the heat-bent clear glass sheet so that air bubbles will not be generated when the sheet structure adheres to the screen of the electronic device. Furthermore, with the adhesive between the screen and the protector, sounds caused by abrasion and collision between the screen and the protector can be prevented, and the screen protector can provide a more comfortable tactility.

In order to further the understanding of the present disclosure, the following embodiments are provided along with illustrations to facilitate the disclosure of the present disclosure.

DETAILED DESCRIPTION OF THE PREFERRED EMBODIMENTS

Figure 1:
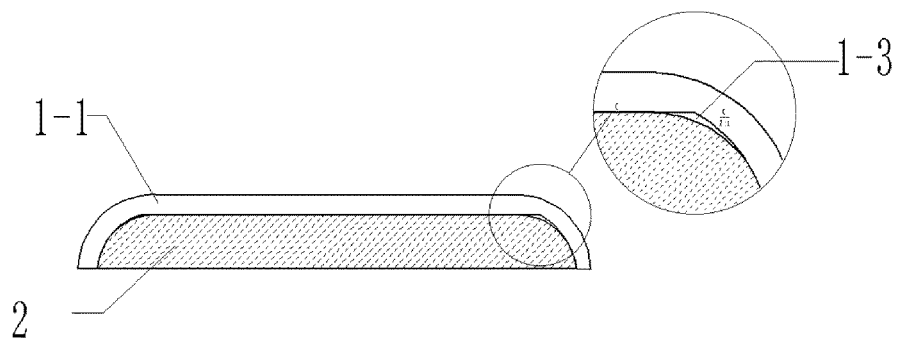
FIG. 1 is a schematic view illustrating a prior art screen protector adhering to an electronic device with a curved surface.

The aforementioned illustrations and following detailed description are exemplary for the purpose of further explaining the scope of the present disclosure. Other objectives and advantages related to the present disclosure will be illustrated in the following description and appended drawings.

It should be noted that components having the same reference number represent the same or identical components. For example, the reference number 1-1 in FIG. 1 and in FIG. 1 both refer to the heat-bent clear glass sheet. It should also be understood that terms adopted in the specification are created merely for the purpose of describing the embodiments of the present disclosure and is not to be deemed to impose limitations to the scope of the present disclosure. Furthermore, for each range of numeric values mentioned in the present disclosure, the upper limit, the lower limit and every numeric value that falls within the range shall fall within the scope of the present disclosure.

The "sheet structure for protecting the screen of an electronic device having a curved surface" as disclosed in the present disclosure refers to a multilayer structure, which is attached to the screen surface of an electronic device so as to protect the screen from external influences such as scraping or scratching, which could cause damage to the screen. The sheet structure has an appearance that matches the appearance of the electronic device.

In some embodiments of the present disclosure, the sheet structure is a three-layer structure, which in the order from the side contacting the screen to the other side of the sheet structure includes a back plate, an adhesive layer and a heat-bent clear glass sheet. When the sheet structure is in use, the back plate can be removed such that the adhesive layer contacts the screen of electronic device directly.

In some embodiments of the present disclosure, the sheet structure includes more than three layers. Apart from the back plate, the adhesive layer, and the heat-bent clear glass sheet mentioned above, the sheet structure further includes a strippable coating and/or a protective film disposed on the other side of the heat-bent clear glass sheet, that is, the side opposite the one that is in contact with the adhesive layer. According to one embodiment of the present disclosure, the protective film is a PET layer with a thickness of 38-100 µm, and a silicone pressure sensitive adhesive layer with a thickness of 5-20 µm is disposed beneath the protective film (between the protective film and the tempered glass). In addition, the strippable coating is a PET film or a release film with a thickness of 23-100 µm. The protective film serves to protect the tempered glass before use, e.g. when the sheet structure is on sale as a finished good, and will be torn off when a user starts to use the sheet structure.

The term "heat-bent glass" as disclosed in the present disclosure refers to a curved glass made by annealing a panel glass in a mold. As commonly known in the art, there is not yet a solution that can completely cover and effectively protect a curved screen. The two common solutions in the prior art, i.e. to protect the screen with a glass having an indented surface or a full-screen coverage glass, are both disadvantageous for their inability to completely cover, complement and stick to the screen surface and the tendency to generate air bubbles.

The term "heat-bent clear glass sheet" disclosed in the present disclosure refers to a glass sheet for being stuck to a curved screen surface of an electronic device. The heat-bent clear glass sheet has a plane portion and a curve portion. The plane portion covers and is in full contact with the flat part of the screen. The curve portion is located at both ends of the heat-bent clear glass sheet and in full contact with the curved part of the screen. Due to problems that often occur during the processing of the glass, a heat-bent clear glass sheet often has an uneven surface and thus does not completely cover and contact a curved screen. According to one embodiment of the present disclosure, the heat-bent clear glass sheet is made of a 2.5D curved glass or a 3D curved glass.

The term "back plate" disclosed in the present disclosure refers to a hard material plate used for binding the adhesive layer to the heat-bent clear glass sheet. Preferably, the surface of the back plate is similar to the surface of the screen of the electronic device that the back plate will adhere to. According to one embodiment of the present disclosure, the thickness of the back plate ranges from 1 mm to 5000 mm. The thickness of the back plate is preferably in a range of 5 mm to 4000 mm, more preferably 10 mm to 2000 mm, even more preferably 15 mm to 1000 mm, and still even more preferably 20 mm to 500 mm. According to one embodiment of the present disclosure, a pressure is exerted to the back plate along a direction that is perpendicular to the surface of the back plate. The pressure is preferably greater than 5 kg/cm$^2$, more preferably greater than 10 kg/cm$^2$, still more preferably greater than 15 kg/cm$^2$, and still even more preferably greater than 20 kg/cm$^2$. The back plate does not deform under the above disclosed levels of pressure. For example, the back plate will not bend, break apart or be worn down under pressure. Preferably, when partially subjected to above disclosed levels of pressure, the back plate transmits the pressure to the adhesive layer, preferably the entire adhesive layer. According to one embodiment of the present disclosure, the material of the back plate is selected from one of plastic, paper and metal. When plastic is selected to be the material of the back plate, the plastic material selected is preferably a hard plastic material with a Shore hardness of at least 90. The hard plastic material can be, but not limited to ABS, POM, PS, PMMA, PC, PET, PBT, PPO, PP, PE, PA, PVC, etc. When paper is selected to be the material of the back plate, the paper material is preferably a hard paper material with a Shore hardness of at least 90. The paper material is preferably made of plant fibers, and more preferably of wood fibers. When metal is selected to be the material of the back plate, the metal material can be but not limited to gold, silver, copper, iron, aluminum, magnesium, titanium and alloy. The present disclosure is not limited by the type of metal of the material. Metals that provide the back plate with strong structure and a flat and smooth surface fall within the scope of the present disclosure.

According to one embodiment of the present disclosure, the back plate is made of different materials. For instance, one part of the back plate that is in contact with the adhesive layer is made of metal, and the other part of the back plate is made of plastic or paper. In other embodiments, one part of the back plate that is in contact with the adhesive layer is made of plastic, and the other part of the back plate is made of metal or paper.

Since the back plate is directly in contact with the adhesive layer, the level of smoothness of the back plate affects the level of smoothness of the adhesive layer. Therefore, it is required that the back plate has a high level of smoothness. The level of smoothness of the back plate is preferably below 0.15. According to one embodiment of the present disclosure, the level of adhesion between the back plate and the adhesive layer is lower than the level of adhesion between the adhesive layer and the heat-bent clear glass sheet.

According to one embodiment of the present disclosure, the back plate has an appearance that is similar to that of the electronic device that the back plate will adhere to.

The term "adhesive layer" disclosed in the present disclosure refers to a transparent layer made of organic compound. The adhesive layer is used for binding the back plate to the heat-bent clear glass sheet and at the same time fill the concave surface of the heat-bent clear glass sheet. The present disclosure is not limited by the material of the adhesive layer. Materials that can fill the concave surface of the heat-bent glass fall within the scope of the present disclosure. Preferably, the thickness of the adhesive layer is great enough to buffer the screen from the frictional force between the screen and the heat-bent clear glass sheet and protect the screen from abrasion, extending the service life of the electronic device.

The material of the adhesive layer can be, but not limited to UV gel, thermoplastic elastomer pressure sensitive adhesive, hot-melt adhesive, oil-based or water-based gel or resin.

According to one embodiment of the present disclosure, there exists a mutual pressure between the back plate and the heat-bent clear glass sheet before the use of the sheet structure. During the time period between the completion and use of the product, e.g. during the transportation of the sheet structure, the mutual pressure between the back plate and the heat-bent clear glass sheet increases the level of adhesion between the adhesive layer and the back plate so that when the sheet structure is applied to the screen of an electronic device and the back plate is removed, the adhesive layer is in full and close contact with the screen, without air gaps between the screen and the adhesive layer.

The way of keeping a mutual pressure between the back plate and the heat-bent clear glass sheet is to seal the sheet structure in a container with a negative pressure. A negative pressure refers to a pressure level below the atmospheric pressure. The container is preferably a vacuum container, and the container can be exemplified as a bag or a box, more preferably a vacuum package bag.

According to one embodiment of the present disclosure, the manufacturing process of the sheet structure includes a curing process. The curing process can be a light curing process, e.g. UV curing, or a thermal curing process. Whether it is a light curing process or a thermal curing process, the curing process must be performed under negative pressure so that the adhesive layer forms a shape that complements the screen of the electronic device when being cured.

In the case in which light curing is selected, the adhesive layer includes a light curable adhesive material, e.g. UV curable adhesive. The present disclosure is not limited by the composition of the UV curable adhesive, which generally contains basic polymers and polymeric compounds. The polymerization curing method using UV radiation can be free radical type, cationic type or anionic type. Alternatively, the method can also be photo-induced type or alternating copolymerization type in which an initiator is not required. Moreover, the curing method can include a combination of the above-mentioned methods. The curing methods that are often used are free radical type and cationic type.

The polymeric compound can be polyester, acrylic, carbamate, amide, polysiloxane, epoxy, and the monomers, oligomers, prepolymers that are UV curable. Preferably, the polymeric compound includes functional groups that are UV polymerizable, in which the polymeric compound preferably includes acrylic monomers or oligomers with at least two functional groups mentioned above. The at least two functional groups can be identical to or different from each other. The UV curable acrylic compounds can be polyacrylate, epoxy acrylate, carbamate acrylate, polyester acrylate, polyether acrylate, spiralaldehyde acrylate, etc. These polymeric compounds can be found in an adhesive compound, and can be bound to functional groups such as the hydroxyl groups of basic polymers.

Preferably, the UV curable adhesive includes initiators for photopolymerization. Photopolymerization initiators are substances that generate free radicals, acids and alkalis when exposed to UV radiation. The type of photopolymerization needed can be selected in accordance with the type of the polymeric compound. Photo radical generators are suitable for photo radical polymerization. Photo acid generators are preferably used in photo cation polymerization. Photo alkaline generators are suitable for photo anionic polymerization. The photo radical generators can be compounds with one or more radical production sites, e.g. hydroxy ketone, dibenzoyl dimethyl ketal, amino ketones, acyl phosphine oxide, diphenyl ketone, contain trichloromethyl triazine derivatives, etc.

The present disclosure is not limited by the type of UV curable basic polymers, which can be acrylic polymers, poly siloxane polymers, polyester, polyurethane, polyamide, polyethylene ether, vinyl acetate/vinyl chloride copolymer, modified polyolefin, epoxy, fluoride, and rubber polymers such as natural rubber and synthetic rubber. The UV curable basic polymer preferably includes a curable adhesive with high optical transparency. For instance, the mist degree of a preferred curable adhesive is below 1.0%, and the overall light transmittance of the curable adhesive is above 90%.

The adhesive with light optical transparency and adhesive properties can be acrylic adhesive with acrylic polymers as the base polymer. Preferably, the acrylic adhesive includes at least 50 percent by weight of acrylic basic polymers, more preferably at least 70 percent by weight, and even more preferably 80 percent by weight.

The acrylic polymers are preferably acrylic polymers with monomers of (methyl) acrylate as the main framework. It should be noted that the term "(methyl) acrylic acid" refers to acrylic acid and/or methacrylic acid. The alkyl methacrylate (SLMA) can preferably be the alkyl methacrylate in which the number of the carton atoms of the alkyl is 1 to 20. The monomers that constitute the basic polymers include at least 40 percent by weight of alkyl methacrylate, preferably at least 50 percent by weight, and more preferably at least 60 percent by weight. The acrylic basic polymers can be the polymers of various alkyl methacrylate. The way of arranging the monomers can be random or block.

The acrylic basic polymers include acrylic monomers with cross-linkable functional groups. When a basic polymer has cross-linkable functional groups, it can be easily cured by UV radiation. The acrylic monomers with cross-linkable functional groups can be hydroxyl monomers or carboxyl monomers, in which hydroxyl monomers are preferably the copolymer of basic polymer. When basic polymers having hydroxyl monomers as monomer units, the basic polymer's ability to crosslink is enhanced, which inhibits the tendency of the adhesive to turn white-opaque at high temperature. Accordingly, an adhesive with high transparency can be obtained.

Apart from the aforementioned alkyl methacrylate and hydroxyl monomers, acrylic polymers can further include high polarity monomers such as nitrogen monomers. With high polarity monomers such as hydroxyl monomer and nitrogen monomers, the adhesive can have high adhesive properties and will not turn white-opaque under high temperature and high humidity conditions.

The acrylic polymers that act as basic polymers can be obtained by various common methods such as solution polymerization, emulsion polymerization and bulk polymerization. Solution polymerization is preferable considering the costs and adhesive properties of the adhesive and the maintenance thereof.

Cross-linked structure can be introduced into the basic polymers of UV curable adhesives. The cross-linked structure can be formed by adding crosslinking agents to basic polymers and heating the basic polymers after the polymerization thereof. Crosslinking agents can be commonly used crosslinking agents such as isocyanate crosslinking agent, epoxy crosslinking agent, thiazole moiety crosslinking agent, n propyl organism crosslinking agent, carbon 2 imine crosslinking agent, and metal chelate plant-based crosslinking agent. In addition, by binding the free radical polymerized compounds having the functional groups that can be bound with the functional groups of the basic compounds and free radical polymerization functional groups with base polymers, free radical polymerization functional groups can be introduced in base polymers. The functional group that can bond with the functional groups of basic polymers is preferably isocyanate. Isocyanates together with the hydroxyl of basic polymers form urethane bonds, facilitating the introduction of free radical polymerization functional groups into basic polymers.

In order to adjust the adhesive properties of the adhesive, silane coupling agents or tackifiers can be added into the adhesive. In addition, the adhesive can further include additives such as plasticizer, softener, anti-degradation agent, filler, colorant, antioxidant, surfactant and antistatic agent.

When the adhesive layer is made of UV curable adhesive, the composition of the UV curable adhesive is preferably as follows:
Monomers: 40-60%
Photoinitiators: 1-6%
Agent: 0.2-1%
The prepolymer is selected from a group consisting of: epoxy acrylate, polyurethane acrylate, polyether acrylate, polyester acrylate, acrylic resin, etc. The monomer is selected from a group consisting of: single functional monomers, e.g. IBOA, IBOMA, HEMA, etc., difunctional monomers, e.g. TPGDA, HDDA, DEGDA, NPGDA, etc., trifunctional and multi-functional monomers, e.g. TMPTA, PETA, etc.

The initiator is selected from a group consisting of: 1173, 184, 907, and diphenylketone.

The present disclosure further provides a method of manufacturing a sheet structure for protecting the screen of an electronic device with a curved surface. The method includes:
(1) a step of sticking or applying an adhesive layer to a back plate and/or a heat-bent clear glass sheet;
(2) a step of binding the back plate to the heat-bent clear glass sheet;
(3) a step of performing a pressure treatment, a hot-pressing process, or a UV curing process on where the back plate and the heat-bent clear glass sheet are bound together;
(4) a step of testing the adhesion between the curve portion of the heat-bent clear glass sheet and the back plate in which, if a gap exists between the curve portion and the back plate, the level of adhesion is determined to be unacceptable, and if there is no gap between the curve portion and the back plate, the level of adhesion is determined to be acceptable.

The way of sticking an adhesive layer to a back plate or a heat-bent clear glass sheet can be either sticking the adhesive layer to the back plate first and then sticking the adhesive layer to the heat-bent clear glass sheet, or sticking the adhesive layer to the side of the heat-bent clear glass sheet facing the back plate (the concave surface of the heat-bent clear glass sheet) first, and then sticking the adhesive layer to the back plate first and then binding the adhesive layer to the heat-bent clear glass sheet.

The way of applying the adhesive layer to the back plate or a heat-beat clear glass sheet can be either applying the adhesive layer to the surface of the back plate first and then combining the back plate with the heat-bent clear glass sheet, or applying the adhesive layer to the concave surface of the heat-bent clear glass sheet first, and then combining the heat-bent clear glass with the back plate. According to another embodiment of the present disclosure, the adhesive layer can be applied to the back plate by dropping an adhesive body onto a part of the back plate, e.g. the central part of the back plate, and then distributing the adhesive body so that the adhesive layer forms evenly on the back plate by covering the back plate with the heat-bent clear glass sheet and exerting a pressing force onto the heat-bent clear glass sheet so that the adhesive body spreads over and fills the gap between the back plate and the heat-bent clear glass sheet. According to yet another embodiment of the present disclosure, the adhesive layer is formed by injecting an adhesive liquid into the gap between the back plate and the heat-bent clear glass sheet.

According to one embodiment of the present disclosure, the back plate and the heat-bent clear glass sheet are bound together by performing a vacuum treatment on the back plate and the heat-bent clear glass sheet so that the back plate and the heat-bent clear glass sheet push against each other. After the vacuum treatment, the adhesive body is cured to form the adhesive layer. The curing process can also be performed before the vacuum treatment. Preferably, the curing process starts during the vacuum treatment and ends before the sheet structure is used by a user. For example, the curing process can be done during transportation, and the duration of the curing process can be 1 second to 10 days. According to another embodiment of the present disclosure, the duration of the curing process can be 1 second to 500 seconds. According to yet another embodiment of the present disclosure, the duration of the curing process can be one day to ten days.

The method of manufacturing the sheet structure provided by the present disclosure further includes a step of testing the adhesion between the curve portion of the heat-bent clear glass sheet and the back plate. After the above-mentioned steps are performed, if air gaps still exist between the curve portion and the back plate, the level of adhesion is determined to be defective, and if there is no air gap between the curve portion and the back plate, the level of adhesion is determined to be approved. Furthermore, since the structure of the back plate matches the structure of the electronic device that the sheet structure will adhere to, the heat-bent clear glass sheet will perfectly complement the electronic device when the sheet structure is actually in use and the back plate is removed.

People skilled in the art should understand that, as long as the purpose of the present disclosure can be achieved, the above described steps do not need to follow a specific order. Furthermore, two or more steps can be performed simultaneously. For example, step (3) and step (4) can be performed at the same time. In addition, people skilled in the art should know that other operations can be performed before or after steps (1)~(4) or between any two steps of steps (1)~(4). These operations can be an optimization or improvement of the manufacturing method of the present disclosure. An example of other operations can be making the back plate by measuring and copying the curvature of the curved surface of the electronic device.

The First Embodiment

FIG. 1 is a schematic view illustrating a prior art glass screen protector adhering to an electronic device with a curved surface. As can be seen from FIG. 1, the curve portion of the heat-bent glass includes indented parts generated during processing, which causes gaps 1-3 when the glass screen protector adheres to the electronic device 2. When looking from the top of the electronic device, these gaps 1-3 are seen as air bubbles at the margin of the glass screen protector.

Figure 2:
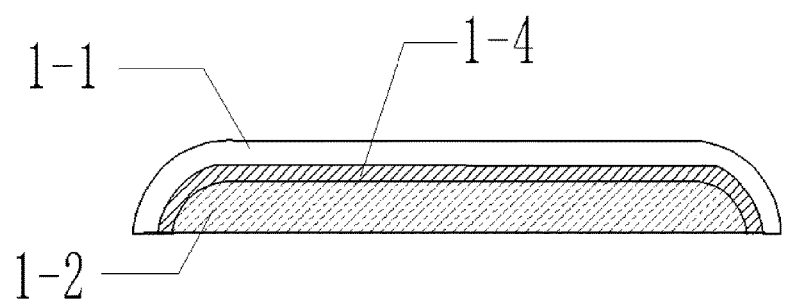
FIG. 2 is a schematic view illustrating a sheet structure according to one embodiment of the present disclosure.
Figure 3:
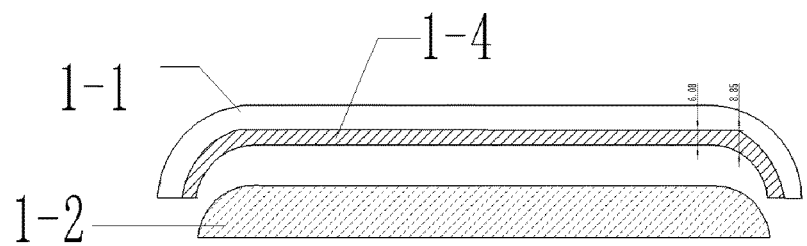
FIG. 3 is a schematic view illustrating the sheet structure according to one embodiment of the present disclosure with the back plate being detached from the adhesive layer.

FIGS. 2 and 3 show the sheet structure according to one embodiment of the present disclosure. As shown in FIGS. 2 and 3, the sheet structure 1 includes a heat-bent clear glass sheet 1-1, a back plate 1-2, and an adhesive layer 1-4, in which the gap between the heat-bent clear glass sheet 1-1 and the back plate 1-2 is filled by the adhesive layer 1-4 so that the heat-bent clear glass sheet 1-1 can be in full contact with the back plate 1-2 or the electronic device 2 without gaps or bubbles therebetween.

FIG. 3 illustrates the sheet structure according to one embodiment of the present disclosure being in use, in which the mutual pressure between the back plate 1-2 and the adhesive layer 1-4 has been released and the back plate 1-2 is removed from the adhesive layer 1-4. The time point where the pressure is released can be after the adhesive layer 1-4 is formed or after the adhesive is cured. According to one embodiment of the present disclosure, the pressure is released by opening a vacuum package bag, which causes the back plate 1-2 to be detached from the heat-bent clear glass sheet 1-1 and the adhesive layer 1-4.

Figure 4:
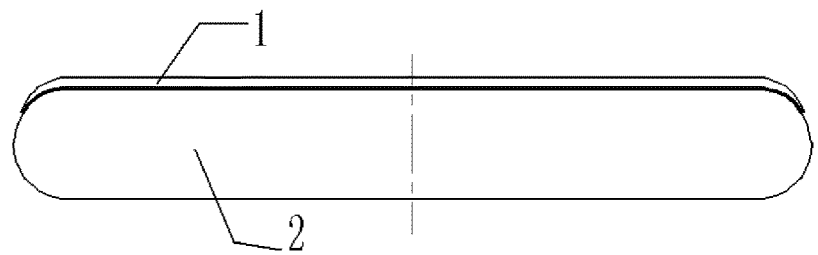
FIG. 4 is a schematic view illustrating the sheet structure according to one embodiment of the present disclosure adhering to an electronic device.
Figure 5:
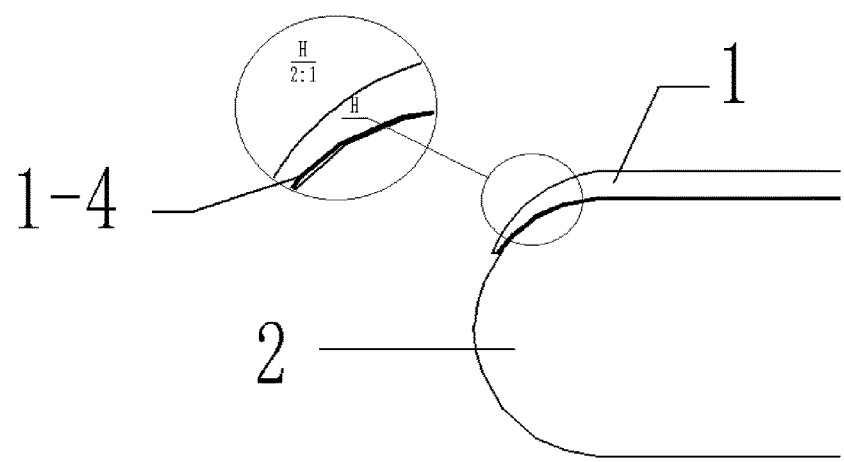
FIG. 5 is a partial enlarged view illustrating the sheet structure according to one embodiment of the present disclosure adhering to an electronic device.

FIG. 4 and FIG. 5 are schematic views illustrating the sheet structure of the present disclosure being used. As can be seen from FIGS. 4 and 5, the sheet structure can be fully and perfectly combined with the electronic device 2. The pressing force exerted by the back plate onto the adhesive layer shapes the adhesive layer 1-4 such that the adhesive layer 1-4 can be in full contact with the screen of the electronic device without any air bubbles therebetween. In this way, even if the clear glass sheet does not completely complement the screen, no bubbles will be generated between the clear glass sheet and the screen.

Moreover, in order to make the edge of the sheet structure be in perfect combination with the edge of the screen of the electric device, the lower part of the curve portion of the heat-bent clear glass sheet has a thickness smaller than that of the plane portion.

It should be noted that when the sheet structure is in a vacuum environment or a pressure is imposed on the sheet structure, the air bubbles between the heat-bent clear glass sheet and the back plate can be evacuated. The surfaces of the adhesive layer become flat due to the pressing force exerted thereon. Accordingly, the surface of the adhesive layer complements that of the screen of the electronic device so that the curved glass can fully contact the curved screen. Therefore, when the sheet structure adheres to the screen of the electronic device, the sheet structure fully covers and contacts the screen, in which no bubbles are generated. Furthermore, the sounds caused by abrasion and collision between the screen and the protector can be prevented, and the screen protector can provide a more comfortable tactility.

It can be seen from FIG. 5 that the part of the adhesive layer that is near the curve portion of the heat-bent glass has a thickness greater than the other part of the adhesive layer. This is due to the uneven surface of the curve portion caused during the processing of the heat-bent glass.

Moreover, it can also be seen from FIG. 5 that the adhesive layer of the present disclosure is not a flat layer; instead, the adhesive layer has uneven surfaces, which is caused by the uneven inner surface of the heat-bent glass.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A method of manufacturing sheet structure for protecting the screen of an electronic device with a curved surface, the method comprising:
   a step of sticking or applying an adhesive layer to a back plate and/or a heat-bent clear glass sheet;
   a step of binding the back plate to the heat-bent clear glass sheet;
   a step of performing a pressure treatment, a hot-pressing process, or a UV curing process on where the back plate and the heat-bent clear glass sheet are bound together; and
   a step of testing the adhesion between a curve portion of the heat-bent clear glass sheet and the back plate in which, if a gap exists between the curve portion and the back plate, the level of adhesion is determined to be defective, and if there is no gap between the curve portion and the back plate, the level of adhesion is determined to be approved, wherein the sheet structure comprises the back plate, the adhesive layer, and the heat-bent clear glass sheet in the order from the side contacting the screen of the electronic device towards the other side of the sheet structure, wherein the back plate is made by measuring and copying the curvature of the curved surface of the electronic device, the adhesive layer is made of an organic compound and used for sticking the back plate and the heat-bent clear glass sheet together and at the same time filling the concave surface of the heat-beat clear glass sheet, and the heat-bent clear glass sheet includes a plane portion and the curve portion, the heat-bent clear glass sheet complementing the curved surface of the electronic device through the adhesive layer so as to protect the curved surface of the electronic device when adhering thereto.

2. The method according to claim 1, wherein a mutual pressure between the back plate and the heat-bent clear glass sheet forces the adhesive layer entering the concave surface of the heat-bent clear glass sheet, in which the mutual pressure is preferably higher than or equal to 15 kg/cm².

3. The method according to claim 2, wherein the material of the adhesive layer is selected from at least one of AB glue, thermoplastic elastomer pressure sensitive adhesive, silicone gel, pressure sensitive adhesive, and UV curable adhesive.

4. The method according to claim 2, wherein the heat-bent clear glass sheet is made of a 2.5D curved glass or a 3D curved glass.

5. The method according to claim 2, wherein the level of adhesion between the adhesive layer and the heat-bent clear glass sheet is greater than that between the adhesive layer and the back plate.

6. The method according to claim 1, wherein the back plate, the adhesive layer and the heat-bent clear glass layer are accommodated in a container having a negative pressure.

7. The method according to claim 6, wherein the container having a negative pressure is a vacuum package bag.

8. The method according to claim 7, wherein the material of the material of the adhesive layer is selected from at least one of AB glue, thermoplastic elastomer pressure sensitive adhesive, silicone gel, pressure sensitive adhesive, and UV curable adhesive.

9. The method according to claim 7, wherein the heat-bent clear glass sheet is made of a 2.5D curved glass or a 3D curved glass.

10. The method according to claim 6, wherein the material of the adhesive layer is selected from at least one of AB glue, thermoplastic elastomer pressure sensitive adhesive, silicone gel, pressure sensitive adhesive, and UV curable adhesive.

11. The method according to claim 6, wherein the level of adhesion between the adhesive layer and the heat-bent clear glass sheet is greater than that between the adhesive layer and the back plate.

12. The method according to claim 6, wherein the heat-bent clear glass sheet is made of a 2.5D curved glass or a 3D curved glass.

13. The method according to claim 1, wherein a hot-pressing process or a UV curing process is performed on at least the adhesive layer.

14. The method according to claim 13, wherein the material of the adhesive layer is selected from at least one of AB glue, thermoplastic elastomer pressure sensitive adhesive, silicone gel, pressure sensitive adhesive, and UV curable adhesive.

15. The method according to claim 13, wherein the heat-bent clear glass sheet is made of a 2.5D curved glass or a 3D curved glass.

16. The method according to claim 1, wherein the material of the back plate is selected from at least one of plastic, paper, and metal.

17. The method according to claim 1, wherein the material of the adhesive layer is selected from at least one of AB glue, thermoplastic elastomer pressure sensitive adhesive, silicone gel, pressure sensitive adhesive and UV curable adhesive.

18. The method according to claim 1, wherein the heat-bent clear glass sheet is made of a 2.5D curved glass or a 3D curved glass.

19. The method according to claim 1, wherein the level of adhesion between the adhesive layer and the heat-bent clear glass sheet is greater than that between the adhesive layer and the back plate.

* * * * *